United States Patent [19]

Verhoeven

[11] Patent Number: 4,468,697

[45] Date of Patent: Aug. 28, 1984

[54] DEVICE FOR AND METHOD OF X-RAY IMAGE PROCESSING

[75] Inventor: Leonardus A. J. Verhoeven, Eindhoven, Netherlands

[73] Assignee: U.S. Philips Corporation, New York, N.Y.

[21] Appl. No.: 411,732

[22] Filed: Aug. 26, 1982

[30] Foreign Application Priority Data

Jun. 15, 1982 [NL] Netherlands .......................... 8202417

[51] Int. Cl.³ .............................................. H04N 7/18
[52] U.S. Cl. .................................... 358/111; 364/414; 378/99
[58] Field of Search .......................... 358/111; 378/99; 364/414

[56] References Cited

U.S. PATENT DOCUMENTS 4,367,490  1/1983  Riederer ............................. 358/111
4,375,068  2/1983  McBride ............................. 358/111
4,393,402  7/1983  Keyes ................................. 358/111

Primary Examiner—Howard W. Britton
Attorney, Agent, or Firm—Jack E. Haken

[57] ABSTRACT

A device for and method of X-ray processing in which a constant adjustable signal value is subtracted from a video signal of an X-ray image in order to correct the video signal for the effects of inherent scatter. The adjustable signal value depends on the X-ray tube voltage, the nature of the object to be examined, the field size etc. so that it is preferably dependent on the X-ray exposure parameters. The video signal is preferably converted into a logarithmic value by means of a logarithmic table which is dependent on the adjustable signal value (or actually on the exposure parameters).

7 Claims, 9 Drawing Figures

DEVICE FOR AND METHOD OF X-RAY IMAGE PROCESSING

The invention relates to a method of processing X-ray images of an object in which the object is irradiated by X-rays, the radiation which has passed through the object is converted into an electric video signal, and the logarithmic value of the signal is displayed on a display device. The invention also relates to a device for processing X-ray images of an object, comprising an imageforming device for generating a video signal, a converter circuit for forming a logarithmic value of the video signal, and a display device for the displaying an image converted of the logarithmic values.

Such a device and method are known from "Optical Engineering", 17, No. 6, 1978, Nov./Dec., pages 652–657. It is known that the X-rays scattered by the object have an adverse effect on the quality of the X-ray image. Notably in cases where quantitative calculations are made on the basis of X-ray images or (densitometry, functional imaging, or measurement of blood flow), the scatter effect reduces the accuracy of the calculations. It has also been found that the quality of a differential image obtained in X-ray image subtraction as described in said publication is also adversely affected by scatter.

It is the object of the invention to provide a method and a device which produce X-ray images or X-ray differential images in which the effect of scatter is substantially reduced. In accordance with the invention, a constant, adjustable signal value is subtracted from the video signal before the logarithmic conversion thereof is performed. Consequently, the part of the video signal which is produced by the scatter is decreased, if not substantially reduced with respect to the remaining video signal. The magnitude of the constant signal value depends inter alia on the hardness of the X-rays (KVp), the size of the irradiated field, properties of the object to be examined (thickness, composition), the distance between the patient and the image-forming device, the scatter grid, etc. A preferred version of a method in accordance with the invention is characterized in that for the formation of X-ray images there is provided a program selection which enables simultaneous selection and adjustment of several exposure parameters which are dependent on an object to be imaged; the constant, adjustable value is then dependent on the exposure parameters. When such a method is used, the constant signal value to be subtracted can be optimally chosen for each type of examination so that the part of the video signal which is produced by scatter can be substantially eliminated, while the actual video signal which represents the shadow image of the object is not influenced. A preferred embodiment of a device in accordance with the invention is characterized in that the device comprises selection and adjusting means for the simultaneous selection and adjustment of a group of object-dependent exposure parameters, one of the parameters, being the adjustable signal value.

It has been found that the preferred embodiment of the device preferably comprises at least one video memory for the storage of an image which has been formed from at least one X-ray image, the output of the memory being connected to an input of the arithmetic means which comprises an adjustable logarithmic converter, and is characterized in that the logarithmic converter is a read/write memory in which there is stored a logarithmic conversion table, the output of the video memory being connected to the address input of the read/write memory. In a device of this kind it is possible to store, for example, a suitably adapted logarithmic conversion table which depends on the adjusted exposure parameters in the read/write memory. A further advantage is that the video signals, including the part which is due to the scatter, are completely stored in the video memory, so that a visual check of the correction for the effect of the scatter is possible, so that overcorrection (e.g. subtraction of an excessive signal value so that the relevant video signal is cut off into the black level) becomes visible and correctable.

The invention will be described in detail hereinafter with reference to embodiments which are shown in the drawing; therein;

FIGS. 1a and b show a device in accordance with the invention;

FIGS. 2a, b, c, and d show a theoretical object, the effect of the object thickness on the video signal, a differential image signal, and the effect of scatter on the video signal;

Figure 1A:
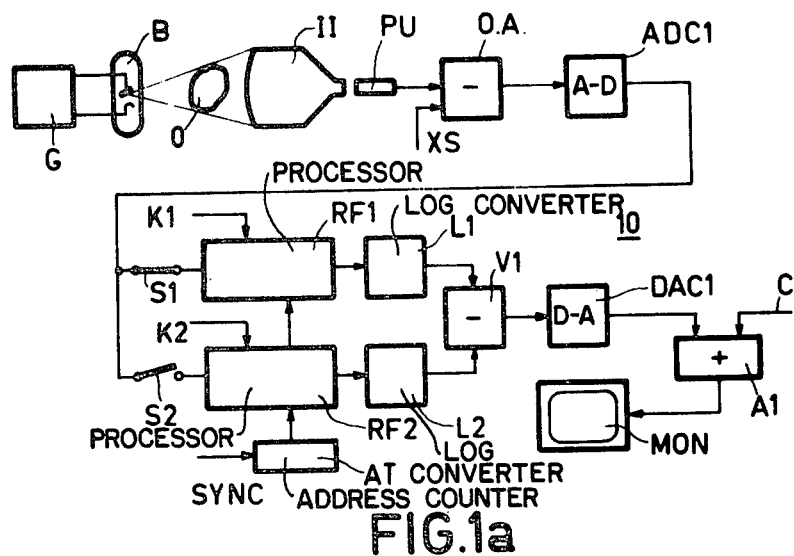

The x-ray examination device for generating differentially enhanced X-ray images which is shown in FIG. 1a comprises a high-voltage source G for powering an X-ray tube B, an image intensifier II, a pick-up tube PU, a differential amplifier OA, an analog-to-digital converter ADC, and two processing devices RF1 and RF2 which are connected to logarithmic converters L1 and L2 and which are connected to the output of the analog-to-digital converter ADC1 via switches S1 and S2. The outputs of the logarithmic converters L1 and L2 which supply the logarithmic value of the video content stored in the memory MM to the subtraction circuit V1 (FIG. 1a) are connected to a subtraction circuit V1, the output of which is connected, via a digital-to-analog converter DAC1 and an adder circuit A1, to display MON.

Figure 1B:
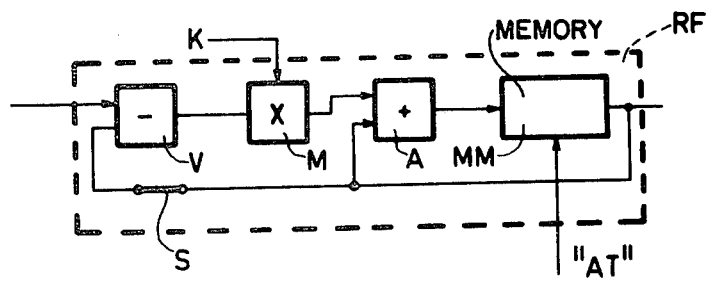

The video signal which is digitized by the converter ADC1 is applied, via switch S1 or S2, to one of the processing devices RF1 or RF2; (FIG. 1b). The processing device RF comprises a recursive filter consisting of a subtraction circuit V, a multiplier M, an adder circuit A, and a memory MM. Using the subtraction circuit V1, a subtraction image is formed from the images stored in the memories MM of the two processing circuits. The image is displayed on the monitor, after the addition of a so-called grey pedestal C to the differential image by means of the adder circuit A1.

The processing circuit RF ( FIG. 1b) comprises a recursive filter which receives the digitized video image. From the images presented, the recursive filter determines a composite image which consists of a weighted sum of the presented X-ray images in accordance with the formule:

$$V_{u(i+1)} = K \cdot V_{i(I)} + (1-K) \cdot V_{u(i)},$$

in which $V_{i(i)}$ is the $i^{th}$ image presented, $V_{u(i)}$ is the $i^{th}$ composite image stored in the memory MM, $V_{u(i+1)}$ is the $(i+1)^{th}$ composite image stored in the memory MM, and K is a weighting factor($0 \leq K \leq 1$).

In order to obtain this result, the $i^{th}$ composite image is read from the memory MM and applied to the subtraction circuit V which also receives the $i^{th}$ video image. The difference is multiplied by a factor K by a multiplier M, after which it is added to the $i^{th}$ composite image in an adder circuit A which is connected to the outputs of the multiplier circuit M and the memory MM for this purpose. For correct (weighted) summing of the video images video synchronization pulses SYNC are applied to an address counter AT (FIG. 1a) which, consequently, always assigns the same pixel of the video image to the same address in the memory MM (for both processing circuits RF1 and RF2). It is to be noted that for the sake of simplicity a simple address counter AT is described in order to illustrate the operation of the processing circuit RF. However, it will be obvious that some time is required for the fetching of video information from an address in the memory MM and for the processing of this information and the video information of a next X-ray image to be added thereto (by the circuit V, M and A). Therefore, so-called pipe line processing techniques have to be used for the processing circuit RF.

For the determination of a differential image a short series of X-ray images (for example, four) is first applied, via S1, to the processing circuit RF1 which forms a composite image (i.e. mask without contrast medium) from the short series. Subsequently, S1 is closed and S2 is opened. From each subsequent series of X-ray images (i.e. after injection of contrast medium in the cardiovascular system) a composite image is determined by the processing circuit RF2. The differential image is formed from the sequentially successive, changing composite images from RF2 and the mask from RF1, so that in principle only the cardiovascular system with contrast medium becomes visible on the monitor.

It is to be noted that the sequentially successive X-ray images in a short series can also be simply summed (for example, in order to reduce the noise effect in an X-ray image, see Optical Engineering, 17, No. 6, Nov./Dec. 1978, pages 652–657). For summing, the processing circuit RF comprises a switch S so that, when the weighting factor K has the value 1 and the switch S is opened, the X-ray images are summed.

In order to reduce the effect of scatter on the images stored in the memories MM of the processing circuits RF1 and/or RF2, an adjustable constant signal value XS is applied to an input of the differential amplifier OA, said signal value XS being subtracted from the video signal. The adjustable signal value XS is determined (in a manner yet to be described) on the basis of the exposure parameters used to form an X-ray image to be processed.

Even though the described device 10 and the device yet to be described hereinafter are intended for generating differentially enhanced images, the invention can also be used per se in X-ray diagnostic devices in which an X-ray image is displayed (and/or electronically stored) by means of electronic means (image intensifier pick-up tube and TV monitor).

Figure 2A:
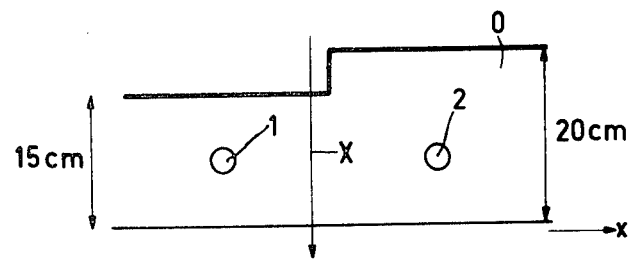
Figure 2B:
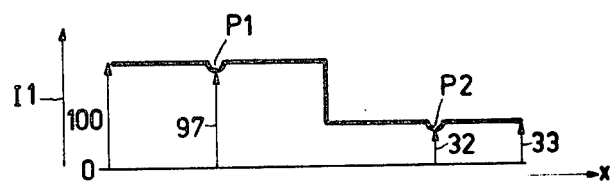
Figure 2C:

FIG. 2a shows a theoretical object O which is irradiated by X-rays in the direction of the arrow X. One half of the object O has a thickness of 15 cm and the other half has a thickness of 20 cm. Each half contains the same blood vessel 1, 2, respectively. The X-ray image provides, as a function of the location x, a video signal which is shown in FIG. 2b. The amplitude $I_1$ of the video signal is assumed to be 100 for the tissue layer having a thickness of 15 cm. The amplitude $I_1$ in the other half then amounts to, for example, 33. When the blood vessels 1 and 2 are filled with a contrast medium, the amplitude $I_1$ exhibits negative (small) peaks $P_1$ and $P_2$ at the area of the blood vessels 1 and 2. If no contrast medium were present in the blood vessels, the negative peaks $P_1$ and $P_2$ would be absent. The amplitude $I_1$ at the area of the peaks $P_1$ and $P_2$ amounts to 97 and 32, respectively ($0.97 \times 100$ and $0.97 \times 33$, respectively). The difference amplitude $I_2$ (the difference between the video signals obtained with contrast medium and without contrast medium, respectively) is shown in FIG. 2c. The difference amplitude $I_2$ amounts to $\Delta = 3$ for the blood vessel 1 and $\Delta = 1$ for the blood vessel 2, even though these blood vessels 1 and 2 are the same. This unsatisfactory situation can be eliminated by amplifying the amplitude $I_1$ measured at the area of the thick object parts more than the amplitude $I_1$ measured at the area of thin object parts. Consequently, in accordance with the state of the art, the amplitude $I_1$ is amplified in a logarithmic manner (the gain characteristic is denoted by the curve LT1 in FIG. 3, Vi being the input amplitude ($I_1$) and Vu the output amplitude).

The amplitude difference $I_2$ shown in FIG. 2c then clearly deviates from the difference between the logarithms of the amplitude $I_1$. The difference at the area of the blood vessel 1 can be expressed in a formule as follows:

$$\log 100 - \log 97 = 0.0132$$

and at the area of the blood vessel 2 as follows:

$$\log 33 - \log 32 = 0.0132.$$

An amplifier which operates exactly in accordance with the logarithm in theory thus solves said problem, because the same signal intensities are obtained for the blood vessels 1 and 2.

Figure 2D:
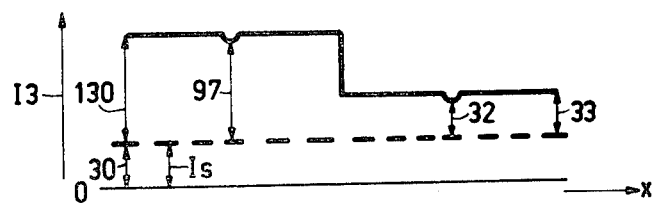

Should scatter occur during the formation of the X-ray images (which is always the case when X-rays encounter matter), the amplitude will vary as diagrammatically shown in FIG. 2d. It is assumed that the ratio of scattered X-rays and non-scattered, direct X-rays is, for example, 1:3.3. It can be deduced therefrom that for an amplitude $I_3$ of 130, the contribution of the direct radiation is 100 and that of the scatter is 30. When on object O as shown in FIG. 2a is irradiated, an X-ray image is obtained with an amplitude $I_3$ which may be considered to consist of a "clean signal" (amplitude $I_1$, FIG. 2b) whereto a noise amplitude $I_s$ has been added. After logarithmic amplification (FIG. 3, curve LT1) of the amplitude $I_3$, the difference at the area of the blood vessel 1 produces the value $$\log 130 - \log 127 = 0.0101$$

and at the area of the blood vessel 2

$$\log 63 - \log 62 = 0.0069.$$

Thus, in spite of an ideal, exact logarithmic amplifier, the signal value of the difference is not the same for the same two blood vessels.

Figure 3:
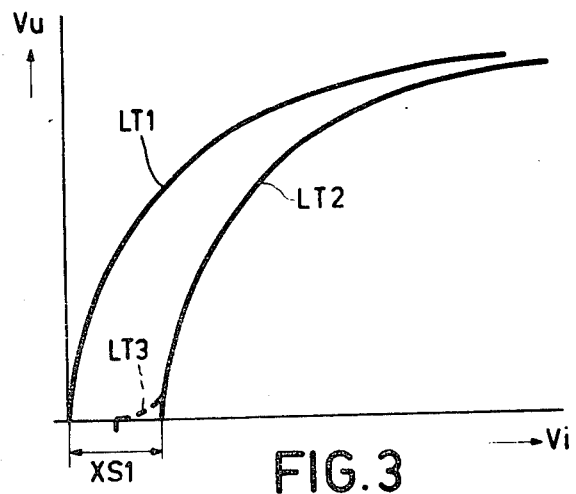
FIG. 3 shows the characteristic of a logarithmic converter in accordance with the state of the art, and characteristics of converters in accordance with the invention.

This problem is solved in accordance with the invention by the subtraction of an adjustable signal value XS whose magnitude is determined by the amount of scatter occurring during the formation of an X-ray image. In FIG. 1a, the signal value XS is applied to the differential amplifier OA which also receives the video signal from the pick-up tube PU. Using the curve LT2, FIG. 3 shows how the conversion of the video signal ($I_3$, FIG. 2d) is actually performed. After subtraction of the adjustable signal value XS, the "cleaned" video signal ($S_i$, FIG. 2b) is converted into a logarithmic value. The adjustable signal value XS depends inter alia on:

the X-ray tube voltage KVp used for an X-ray exposure, the size of the irradiated field, the nature of the object to be examined (bones, tissue), the distance used between X-ray tube, object and image intensifier, and the scatter grid used between the object and the image intensifier.

In a X-ray examination device offering program selection (known organ-programmed X-ray apparatus) in which several object-dependent groups of X-ray exposure parameters (of the described kind) can be simultaneously selected and adjusted by means of a selector, it is advantageous to provide, at the same time, an adjustable signal value XS (to be determined experimentally) which is applied to the differential amplifier OA.

Figure 4:
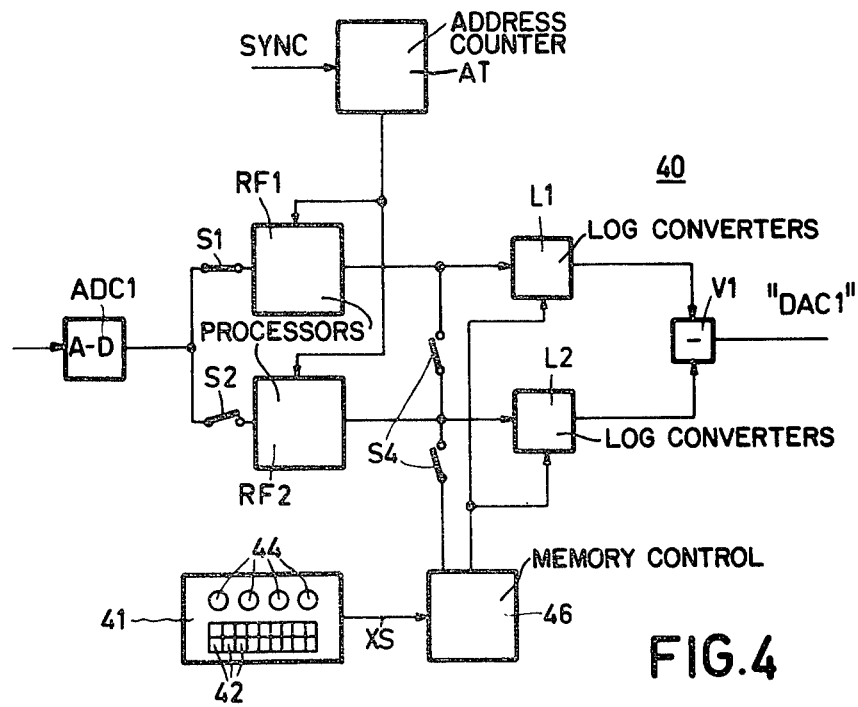
FIG. 4 shows a preferred embodiment of a device in accordance with the invention.

FIG. 4 shows a preferred embodiment of a device 40 in accordance with the invention in which the correction for the effect of scatter is performed in a further manner. The video signal ($I_3$) originating from the pick-up tube PU is applied in its entirely, after amplification by the amplifier OA (in which no correction is performed by means of the signal XS in this case), to the converter ADC1 in order to be processed by the processing circuits RF1 and/or RF2 in the manner described with reference to the FIGS.1a and 1b. However, in this case a logarithmic characteristic is stored in the logarithmic converter L1 as well as in the logarithmic converter L2, said characteristics corresponding to the curve LT2 of FIG. 3. Because the signal value XS must be adjustable, the converters L1 and L2 are formed by read/write memories, so that the conversion tables stored in the memories (for each imput signal Vi (address) and output signal Vu (content at the address Vi)) can be rewritten in accordance with the nature of the X-ray exposure.

When a group of exposure parameters are selected for a given type of X-ray examination, one of the selector button 42 is depressed on a console 41. Simultaneously with exposure parameters (KV, the thickness of the patient, distance between the patient and the imaging device, etc.), the adjustable signal value XS which is stored in a memory (not shown) in the control console 41, together with the other parameters, is fetched. The exposure parameters are also manually adjustable by means of knobs 44 whereby the X-ray tube voltage, patient thickness, distance between patient and image intensifier, etc. can be selected. Using selection means, an address can be formed from the values of the adjusted parameters, said address being used to address the appropriate adjustable signal value XS in a table in a memory. The signal value XS is presented to a memory control unit 46 which modifies the control of the converter memories L1 and L2 on the basis thereof. The control unit 46, therefore, is to be connected to the address inputs of the converter memories L1 and L2 via switches S4, and to the data input/output of the converter memories L1 and L2 via a further connection. Depending on the signal value XS or on the group of exposure parameters, a curve LT (FIG. 3) is completely rewritten in the converter memories L1 and L2; attention should be paid that the dynamic range of the output signals (Vu) is in no way restricted (range between black level and white level on the display monitor). It is also possible to shift the values stored at the addresses in dependence of the magnitude of the signal value XS one, two or more address positions further (the curve LT2 in FIG. 3 is shifted towards LT1 when the signal value XS decreases, and away therefrom when the signal value XS increases). The dynamic range of the output signal Vu (FIG. 3) might thus be slightly restriced in the "white" level.

It has been found that the curve LT2 preferably does not have an abrupt "beginning" as shown in FIG. 3, but rather a "starting phase" as denoted by a broken line LT3 in FIG. 3. In the case of such a curve LT3, any cut-off of the black level of the video signal (which occurs when the adjustable signal value XS is chosen to be too high in relation to the actual scatter occurring) will be less abrupt.

Figure 5:
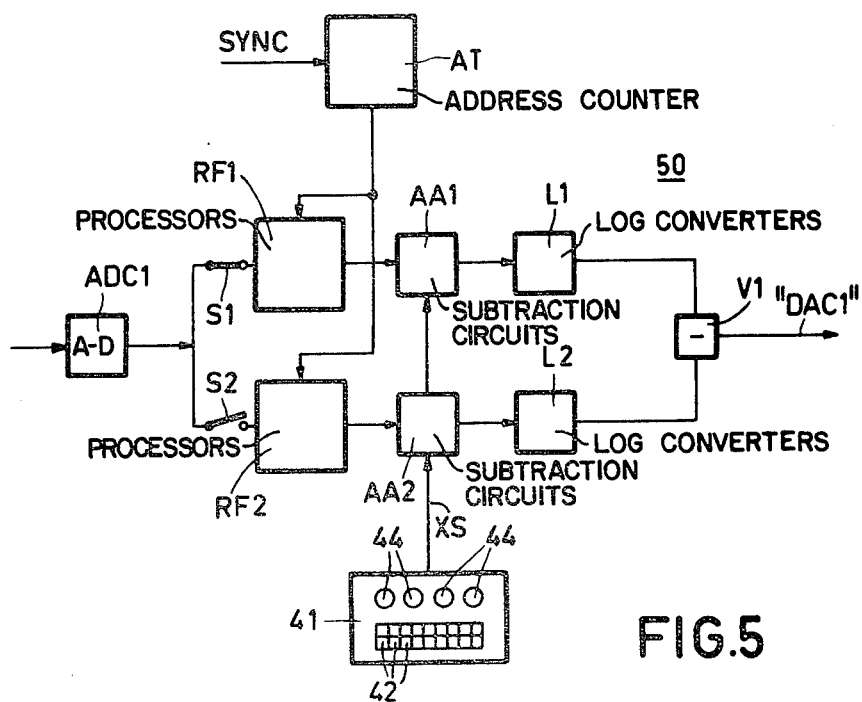
FIG. 5 shows a modification of the device shown in FIG. 4.

FIG. 5 shows a modification 50 of the device 40 shown in FIG. 4. The signal value XS determined on the control console 41 by means of the selectors 42 or adjusting knobs 44 is presented directly to the subtraction circuits AA1 and AA2 which also receive the content of the memories MM of the processing circuits RF1 and RF2. The difference between the signal value XS and the content of the memories MM is presented to the converters L1 and L2, respectively. The converters L1 and L2 may now be read-only memories (ROM) in which the curve LT1 (FIG. 3) or a slight modification thereof (in the sens of the curve LT3) is permanently stored.

It is to be noted that in the device 10 (FIG. 1a) there is a risk that some video information in the black level is cut off from the video signal by subtraction of the signal value XS from the video signal. In the preferred embodiment to the device 40 (FIG. 4) and the modification 50 (FIG. 5) thereof, this phenomenon is avoided, because the processing devices RF1 and RF2 store the entire video signal (or weighted sums thereof), and the correction for scatter is performed only at a later stage, followed by display, so that adaptation is possible.

What is claimed is:

1. A method for making X-ray images of objects comprising the steps of:

storing, in a memory, a plurality of X-ray exposure programs, wherein each exposure program includes the values of a multiplicity of exposure parameter settings which are suitable for producing X-ray images of a particular class of objects and the level of X-ray scatter in the object is determined by a combination of the values of at least two of said parameter settings, and an associated scatter radiation compensation value;

selecting one of said programs from said memory for producing an image of a particular object and adjusting the values of exposure parameter settings of X-ray aparatus to the values specified in said selected program;

irradiating said particular object with said X-ray apparatus in accordance with said selected values and producing an electric video signal which is representative of the amplitude of X-radiation which has passed through the object;

subtracting the value of said associated scatter radiation compensation signal from the amplitude of the video signal to generate a difference signal and generating a display signal which is proportional to the logarithm of the difference signal; and producing a display having pixels whose brightness is proportional to a corresponding instantaneous amplitude of said display signal.

2. The method of claim 1 wherein each exposure program in the memory further includes a table of values of the logarithms corresponding to values of an associated difference signal.

3. The method of claim 1 wherein the program contains the values of at least two of the hardness of X-rays, the size of an irradiated field, the thickness and/or composition of the object, the distance between the object and an image forming device, and the distance between the object and a scatter grid.

4. Apparatus for making X-ray of objects comprising:

a memory which contains a plurality of X-ray exposure programs, wherein each exposure program includes the values of a multiplicity of exposure parameter settings which are suitable for producing X-ray images of a particular class of objects and the level of X-ray scatter in the object is determined by a combination of the values of at least two of said parameters, and an associated scatter radiation compensation signal value;

X-ray exposure means comprising X-ray source means for directing X-radiation through the object and image forming means for producing a video signal representative of the amplitude of X-rays which have passed through the object;

means for selecting a particular program from the memory and for adjusting the X-ray exposure means in accordance with the values of the parameter settings in said selected program;

means which subtract the value of said scatter radiation compensation signal from said video signal to produce a difference signal;

means which produce a display signal having an amplitude which is representative of the logarithm of the difference signal; and means which produce a visual display wherein the brightness of points in the display is proportional to the amplitude of corresponding points in the display signal.

5. The apparatus of claim 4 wherein the memory program further includes a table containing the values of the logarithms of corresponding values of the associated difference signal and wherein the means for producing the display signal selects a value from said table in accordance with the corresponding value of the difference signal.

6. The apparatus of claim 4 wherein each program contains the values of at least two of: the hardness of the X-ray, the size of the irradiated field, the composition and/or thickness of the object, and the distance between the object and the image forming means.

7. The apparatus of claim 6 further comprising a scatter grid and wherein the program further contains the value of the distance between the object and the scatter grid.

* * * * *